(12) United States Patent
Lacey et al.

(10) Patent No.: US 11,144,931 B2
(45) Date of Patent: Oct. 12, 2021

(54) MOBILE WIRELESS CUSTOMER MICRO-CARE APPARATUS AND METHOD

(71) Applicant: AT&T Mobility IP, LLC, Atlanta, GA (US)

(72) Inventors: Bruce Blaine Lacey, Foster City, CA (US); Ellis L. Wong, Lexington, MA (US); Steven R. Carr, San Jose, CA (US)

(73) Assignee: AT&T MOBILITY IP, LLC, Atlanta, GA (US)

( * ) Notice: Subject to any disclaimer, the term of this patent is extended or adjusted under 35 U.S.C. 154(b) by 274 days.

(21) Appl. No.: 16/143,333

(22) Filed: Sep. 26, 2018

(65) Prior Publication Data

US 2019/0026748 A1  Jan. 24, 2019

Related U.S. Application Data (62) Division of application No. 14/142,204, filed on Dec. 27, 2013, now abandoned.

(60) Provisional application No. 61/769,188, filed on Feb. 25, 2013.

(51) Int. Cl.
  *G06Q 30/00* (2012.01)

(52) U.S. Cl.
  CPC .................. *G06Q 30/016* (2013.01)

(58) Field of Classification Search
  CPC .. G06Q 30/016; G06Q 30/01; G06Q 10/0639; H04W 24/04; H04W 24/08
  USPC .......................................... 705/304; 709/224
  See application file for complete search history.

(56) References Cited

U.S. PATENT DOCUMENTS

| | | | |
|---|---|---|---|
| 6,754,470 B2 * | 6/2004 | Hendrickson | H04L 41/12 455/405 |
| 7,551,922 B2 * | 6/2009 | Roskowski | H04W 24/00 455/226.1 |
| 7,609,650 B2 * | 10/2009 | Roskowski | H04L 43/00 370/241 |
| 7,650,331 B1 | 1/2010 | Dean et al. | |

(Continued)

OTHER PUBLICATIONS

16143333 EIC 3600 Search Report—dated Aug. 18, 2020 (Year: 2020).*

(Continued)

*Primary Examiner* — Andrew B Whitaker
*Assistant Examiner* — Johnathan J Lindsey, III
(74) *Attorney, Agent, or Firm* — Amin, Turocy & Watson, LLP (57) ABSTRACT

In one example, a data package created by a particular wireless mobile device, and comprising metrics collected by the wireless mobile device, is retrieved. The metrics concern performance of the wireless mobile device in a wireless communication network, and are transformed into measures that enable derivation of a key performance indicator concerning the performance of the wireless mobile device. An enriched measure is generated by processing the measures based on correlations of wireless mobile device events in a time sequence, and the enriched measure is transformed into a KPI that is specific to the performance of the wireless mobile device. The KPI of the wireless mobile device is compared to a KPI of the population of wireless mobile devices, and results of the comparison of KPIs serve as a basis to resolve a problem regarding operation of the wireless mobile device.

20 Claims, 10 Drawing Sheets

(56) References Cited

U.S. PATENT DOCUMENTS

| | | | | |
|---|---|---|---|---|
| 8,589,323 | B2* | 11/2013 | Keith, Jr. | G06N 5/04 706/46 |
| 8,706,798 | B1* | 4/2014 | Suchter | H04L 43/0876 709/202 |
| 8,855,627 | B2* | 10/2014 | Ding | H04W 24/04 455/425 |
| 2006/0074911 | A1 | 4/2006 | Neagovici-Negoescu | |
| 2006/0106806 | A1* | 5/2006 | Sperling | G06F 21/57 |
| 2006/0145133 | A1* | 7/2006 | Komarla | H04L 67/34 257/1 |
| 2007/0118839 | A1 | 5/2007 | Berstis | |
| 2007/0243881 | A1* | 10/2007 | Roskowski | H04W 24/00 455/456.1 |
| 2009/0207749 | A1* | 8/2009 | Roskowski | H04L 41/0681 370/252 |
| 2010/0223298 | A1* | 9/2010 | Lam | G06F 16/284 707/803 |
| 2011/0106942 | A1 | 5/2011 | Roskowski | |
| 2011/0161338 | A1* | 6/2011 | Moore | H04W 4/00 707/758 |
| 2011/0213663 | A1* | 9/2011 | Hoffman | G06Q 30/0282 705/14.58 |
| 2011/0231360 | A1* | 9/2011 | Hoffman | G06F 16/283 707/602 |
| 2011/0314438 | A1* | 12/2011 | Surazski | G06Q 30/012 717/100 |
| 2012/0259877 | A1* | 10/2012 | Raghunathan | G06F 21/6254 707/757 |
| 2012/0323870 | A1 | 12/2012 | Hadjieleftheriou | |
| 2013/0290525 | A1* | 10/2013 | Fedor | H04L 41/147 709/224 |
| 2014/0156539 | A1* | 6/2014 | Brunet | G06Q 30/01 705/304 |

OTHER PUBLICATIONS

16143333 EIC 3600 Search Report—dated Mar. 22, 2021 (Year: 2021).*
U.S. Appl. No. 61/769,188, filed Feb. 25, 2013, Steven R. Carr, et al.
U.S. Appl. No. 14/142,204, filed Dec. 27, 2013, Bruce Blaine Lacey, et al.
U.S. Appl. No. 14/221,545, filed Mar. 21, 2014, Steven R. Carr, et al.
Peng et al, "Large-scale Incremental Processing using Distributed Transactions and Notifications" 2010.
Carrier IQ, "Understanding Carrier IQ Technology: What Carrier IQ Does and Does Not Do." Dec. 12, 2011. https://www.franken.senate.gov/?p=press_release&id=1891.
Ngamsuriyaroj, "Optimal Placement of Pipeline Applications on Grid." 14th IEEE International Conference on Parallel and Distributed Systems (2008). pp. 245-251. http://ieeexplore.ieee.org/stamp/stamp.jsp?arnumber=4724326.
U.S. Appl. No. 14/221,545, Oct. 6, 2016, Restriction Requirement.
U.S. Appl. No. 14/221,545, Jan. 4, 2017, Office Action.
U.S. Appl. No. 14/142,204, Sep. 20, 2017, Office Action.
U.S. Appl. No. 14/221,545, Jul. 25, 2017, Final Office Action.
U.S. Appl. No. 14/221,545, Oct. 23, 2017, Office Action.
U.S. Appl. No. 14/142,204, May 3, 2018, Final Office Action.
U.S. Appl. No. 14/221,545, Jun. 15, 2018, Final Office Action.
Final Office action received for U.S. Appl. No. 14/221,545 dated Oct. 3, 2019, 14 Pages.

* cited by examiner

MOBILE WIRELESS CUSTOMER MICRO-CARE APPARATUS AND METHOD

RELATED APPLICATIONS

This application is a divisional of U.S. patent application Ser. No. 14/142,204, entitled MOBILE WIRELESS CUSTOMER MICRO-CARE APPARATUS AND METHOD, filed Dec. 27, 2013, which is a non-provisional application of U.S. Provisional Patent Application Ser. 61/769,188, entitled MOBILE WIRELESS CUSTOMER MICRO-CARE APPARATUS AND METHOD, filed Feb. 25, 2013. All of the aforementioned applications are incorporated herein in their respective entireties by this reference.

BACKGROUND

One dimension of the transformation of global communications is the increasing complexity of devices. Coupled to the fragmentation of the industry is the dramatic growth in adoption. The result is that the bottom line of Operators and Device Manufactures is substantially impacted by the cost of returned devices and other costs of supporting dissatisfied customers.

A high rate of customer churn is attributed to several expensive phenomena: when customers report their frustrations, long hold times for support calls are the first experience. On the vendor carrier side, they incur a high cost of support without much benefit. Many calls are repeated without successful resolution. Frequently the proposed solution is to offer to exchange phones for the customer but returned devices exhibit a high rate of no fault found. The replacement devices often exhibit the same or other failures which lowers customer satisfaction with the product offering and as soon as practicable, the customer departs for another vendor. Thus the cost of acquiring new customers is aggravated with the cost of replacing lost customers.

Commonly, customers report that the support organizations do not appreciate the problems, take a long time to make any progress, and have few tools at hand. After a long and fruitless interaction, resetting the device to factory settings is the only suggestion. Analysis conducted at the time of the support call may not expose the source of a problem that has occurred in the past at a different location. By the time the customer has established connectivity with the support call line, the useful data may have vanished, even though a customer may have experienced the same fault multiple times.

With the market for connected mobile devices accelerating, and smartphones and tablets continuing their market penetration, support costs are sharply increasing, fueled by a combination of factors, including uncertified applications, new interfaces, complexity of devices, fragmentation of operating systems, and the frequency of updates.

Mobile operators typically have access to a wealth of data from their networks and some user-generated information, but they have little insight on what is happening on the device itself. Only device-sourced metrics can give operators a true representation of the performance of a device to help resolve device support issues and improve the consumer experience. Operators are constantly striving to increase service quality and customer satisfaction to improve the overall customer experience. There is a great need to focus on improved care, particularly from the consumer's perspective.

As is known, MapReduce refers to a programming model for processing large data sets with a parallel, distributed algorithm on a cluster. A MapReduce program is composed of a first procedure that performs filtering and sorting (such as sorting into multiple queues) and a second procedure that performs a summary operation (such as counting the number of occurrences in each queue, yielding frequencies). The "MapReduce System" (also called "infrastructure" or "framework") orchestrates by marshalling the distributed servers, running the various tasks in parallel, managing all communications and data transfers between the various parts of the system, and providing for redundancy and fault tolerance.

The model is inspired by the map and reduce functions commonly used in functional programming, although their purpose in the MapReduce framework is not the same as in their original forms. Furthermore, the key contributions of the MapReduce framework are not the actual map and reduce functions, but the scalability and fault-tolerance achieved for a variety of applications by optimizing the execution engine once.

MapReduce libraries have been written in many programming languages, with different levels of optimization. A popular open-source implementation is Apache Hadoop. Discovering correlations or patterns within large datasets is a suitable application of this parallel computing strategy. U.S. Pat. No. 7,650,331, SYSTEM AND METHOD FOR EFFICIENT LARGE-SCALE DATA PROCESSING, issued Jan. 19, 2010, pertains to this subject. But such simple parallel flow is not universally applicable to all problems poised for large datasets. It is the observation of the Applicants that a conventional MapReduce style of processing is unsatisfactory for low latency analysis such as interactive customer support.

A long sought desire has been for a customer care solution aimed at reducing the duration of customer support calls, decreasing the number of no-fault-found device returns, and improving the consumer experience with explicit permission from the end user, and without tangible impact on battery drain rates, data plan usage or user experience. Any reduction in "no fault found" or in customer care call length increases profitability.

Both manufacturers and service providers have a desire to ensure customer satisfaction but each control only a piece of the puzzle i.e. the network and the end-user terminals and neither control the radio channel across the planet.

Because end-users further have the ability to install many apps, not long after any two mobile wireless devices have been in customer hands, their configurations are likely to diverge.

It can be difficult to first determine what is "normal" for millions of mobile wireless devices, all slightly different. Then for any individual mobile wireless device user, is the hardware, software, or communication channel substantially divergent from normal for like peers or within a range of reasonable expectation? What is needed is a way to meaningfully evaluate the performance of an individual mobile wireless device.

SUMMARY OF THE INVENTION

Measurements are taken at each mobile wireless device and subsequently stored and aggregated.

Each member of a mobile wireless population is configured with a data collection agent which collects data according to a modifiable data collection profile. The collected data are packaged and uploaded to a distributed store. Massive parallel transformations anonymize, aggregate, and abstract the performance characteristics in a multi-dimensional space. This overcomes a huge volume of data to discover trends and network related inadequacies for planning and optimization.

Upon demand, data from individual mobile wireless devices may be extracted for comparison.

But having all the comparable values for every individual is uneconomic and unwieldy. The invention provides that the data packages from a selected data collection agent can be located for a period of time and the same transformations can be applied in miniature to obtain statistics which are comparable to the aggregates.

Analyze variances to ID potential causes of customer dissatisfaction.

Possibly the customer is dissatisfied by not knowing that his perceived performance is within the range acceptable to all users generally. Or there may be a particular out of normal set of measurements that suggest a remedy or at least a problem analysis flow or pattern. Rather than depend on subjective perception of what is good or bad, or seek to achieve arbitrary thresholds of acceptance, a comparison with whatever is normal across a category of like users can be insightful.

Detailed and immediate issue resolution and remedies for better costs and revenue.

Avoiding the return and refurbishment of equipment which are within spec, and increasing loyalty and satisfaction of customer/subscribers can lower costs and increase margins and profitability. Being responsive in identifying a specific individual problem and offering a particular remedy can change the perception of a supplier's reputation.

Identical transformations applied to an individual device as well as across the entire comparable population of devices enables reactive care to a customer incident.

As data packages are received from individual devices and stored into a distributed store, a record is kept enabling retrieval of any specific device during a range of time (e.g. last 72 hours). The transformations can be performed both in parallel for the population of all devices as a scheduled job, and can also be performed on-demand for packages from a single device in a matter of seconds or minutes. The identical transformations enable meaningful comparison of a specific user's results with the group of like users. This can be accomplished while the user is on the phone to his support center. Then individualized suggestions can be made in real time to adjust settings or install pertinent updates.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS

The subject matter of this patent application is a method and architecture which transforms measurements taken for a population in aggregate and also transforms measurements taken for a selected member of the population for comparison.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the descriptions, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer systems registers and memories into other data similarly represented as physical quantities within the computer system memories or registers or other such non-transitory information storage, communication circuits for transmitting or receiving, or display devices.

The present invention also relates to apparatus for performing the operations herein. This apparatus may be specifically constructed for the required purposes, or it may comprise application specific integrated circuits which are mask programmable or field programmable, or it may comprise a general purpose processor device selectively activated or reconfigured by a computer program comprising executable instructions and data stored in the computer. Such a computer program may be stored in a non-transitory computer readable storage medium, such as, but not limited to, any type of disk including floppy disks, optical disks, CD-ROMs, magnetic-optical disks, solid state disks, flash memory, read-only memories (ROMs), random access memories (RAMS), EPROMS, EEPROMS, magnetic or optical cards, or any type of non-transitory media suitable for storing electronic instructions, and each coupled to a computer system data channel or communication network.

The algorithms and displays presented herein are not inherently related to any particular computer, circuit, or other apparatus. Various configurable circuits and general purpose systems may be used with programs in accordance with the teachings herein, or it may prove convenient to construct more specialized apparatus to perform the required method steps in one or many processors. The required structure for a variety of these systems will be apparent from the description below. In addition, the present invention is not described with reference to any particular programming language or operating system environment. It will be appreciated that a variety of programming languages, operating systems, circuits, and virtual machines may be used to implement the teachings of the invention as described herein.

To take advantage of a large array of available compute engines, the problem is broken up to provision metrics to measures transformations in parallel to a large number of compute engines local to the data packages which minimizes data transfer. The same or other compute engines operate on a plurality of measures output from the metrics to measures transformation to enrich the measures by applying correlations based on time. As data packages are presented to the metrics to measures transformations in sequential time, the enrichments can continue to improve the information by inferences based on correlations of events in time sequence.

From the continuously improving enriched measures, certain Key Performance Indicators (KPI) are derived. A third set of transformations, which may be assigned to compute engines, operate on the enriched measures to generate KPI for the population of wireless mobile devices as a whole or for selected subsets.

Figure 4:
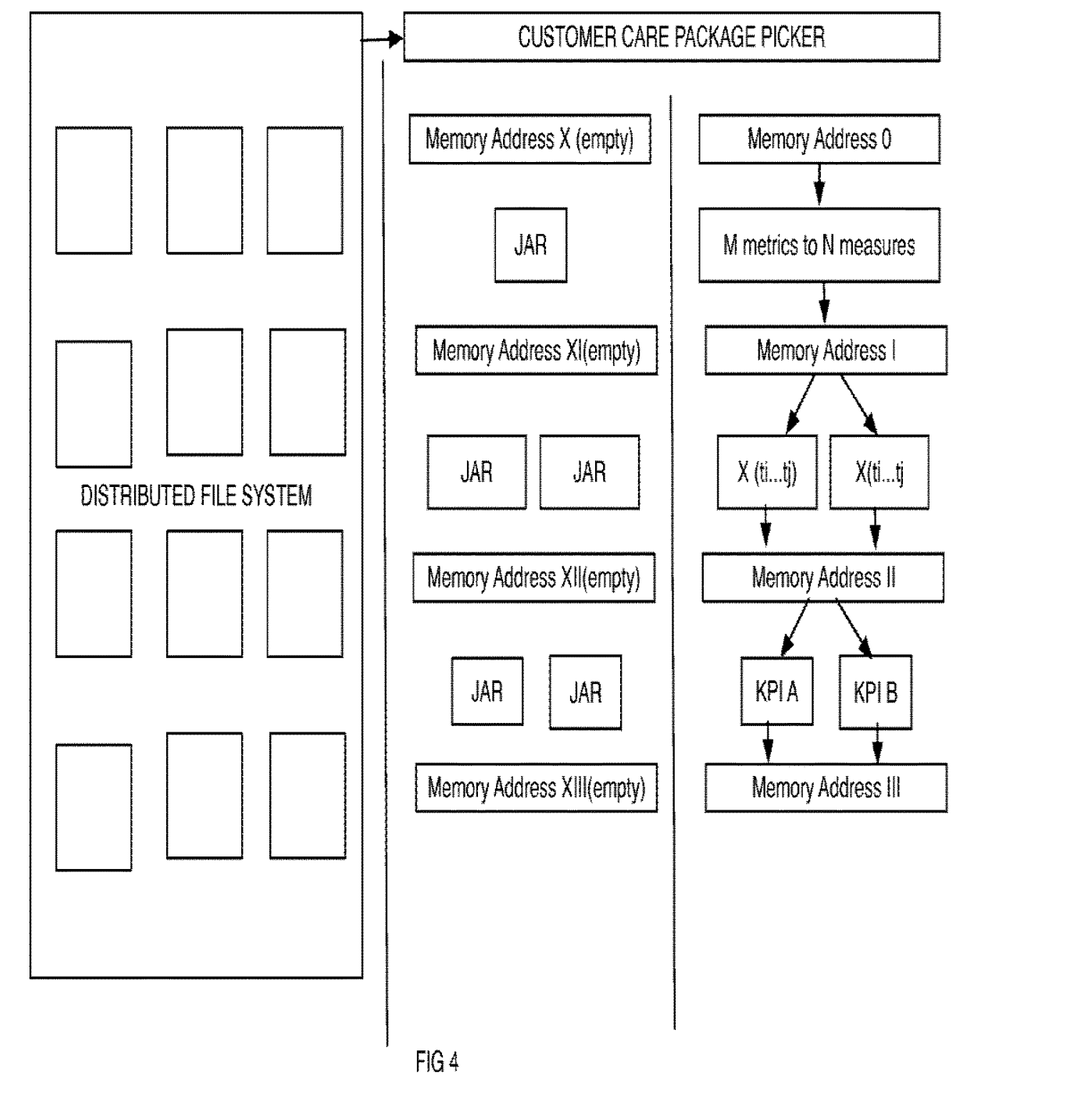
FIG. 4 shows expansion of a second silo to support a second customer support transformation of metrics.

Referring now to FIG. 4, Mode 2 in an embodiment, a sequential indexed access method allows direction of data collection packages from an individual wireless mobile device as the distributed files system is streamed to a customer care silo which comprises compute engines configured to make certain transformations of a flow. One or more compute engines are configured to read certain memory addresses and transform metrics to measures and write them to another memory address. Disk I/O is eliminated for the silo.

A second compute engine or group of compute engines performs correlations on the measures to enrich the measures over time i.e. over a series of data packages. The enriched measures are written at another memory address.

When storage at that memory address is occupied, a third compute engine (having been so configured) operates on the enriched measures to generate Key Performance Indicators (KPI) that are comparable to the KPI generated on the whole population or any subset. A second silo illustrates that the same flow or a different flow can be provisioned to another group of compute engines which depend on data being transferred into their respective input memory addresses such as when a second customer calls for care.

Figure 6:
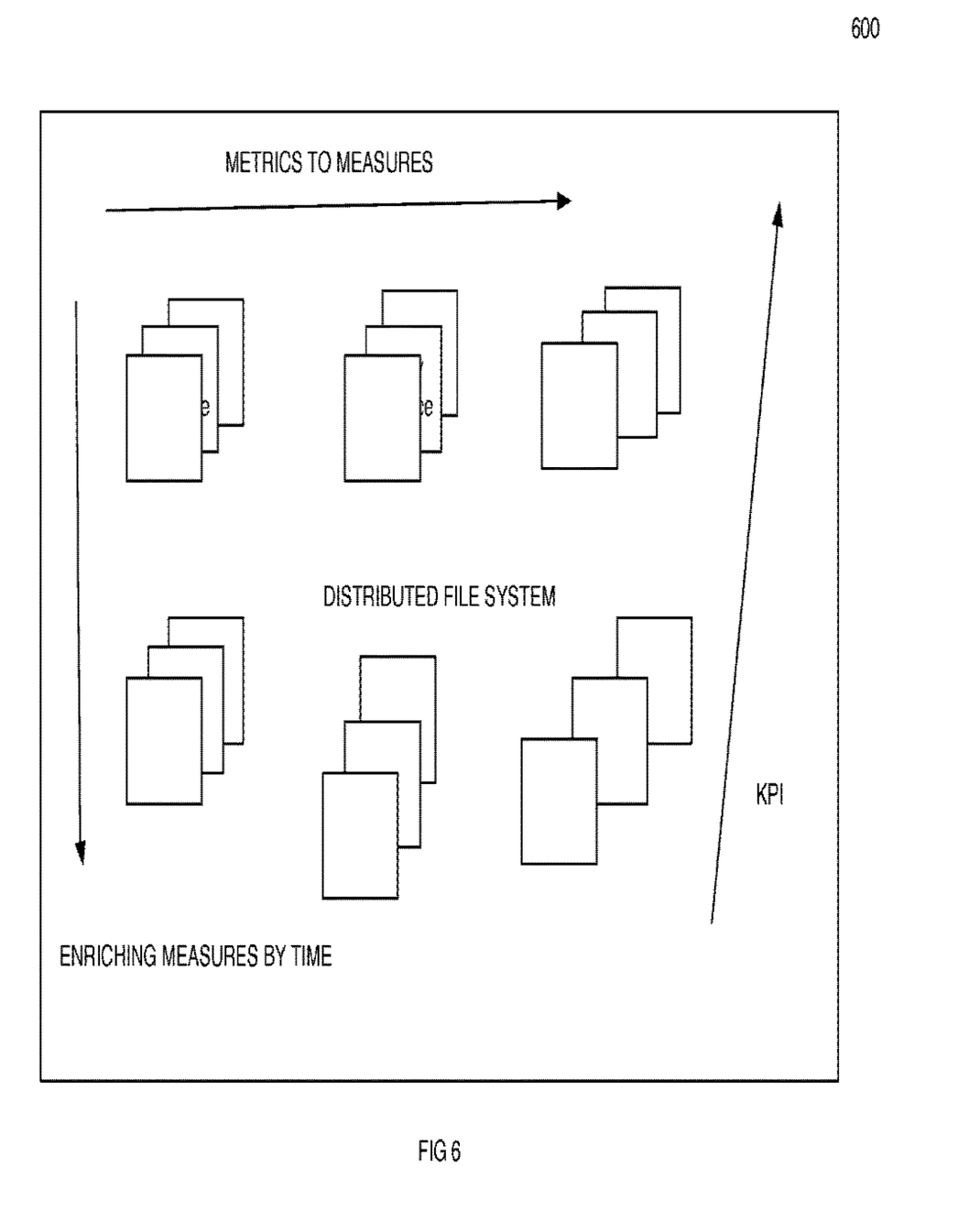
FIG. 6 illustrates the transformation of metrics can proceed along alternate dimensions to arrive at comparable results.

Referring to FIG. 6, a distributed file system contains multiple large blocks of sequentially received and stored data collection packages transmitted from a plurality of wireless devices on conditions specified in their respective data collection packages. The data and time of the reception/storage is subsequent and asynchronous from the collection of the data at the wireless mobile device. The file system supports processors both in a conventional mode and in a hot mode.

In mode 1, a conventional multiprocessor application, the results are aggregate results at every stage. Compute nodes may operate at more than one task, KPI generation, enrichment, or transforming metrics to measures as assigned. In mode 2 a compute node remains assigned to a task even when idle during one assignment. Some resources are always under utilized to enable low latency response to a customer request.

In an other embodiment, an array of nodes dynamically operated as a Hadoop framework is reconfigured upon demand to provide low latency support for individual customers. Data packages are poured through a mesh of map reduce daemons to determine enriched facts.

In comparison, a conventional Map/Reduce environment, data is unstructured and streamed to a plurality of parallel localized nodes. The massively parallel operation of all steps is accomplished by the stages of Map and subsequent Reduce.

Figure 2:
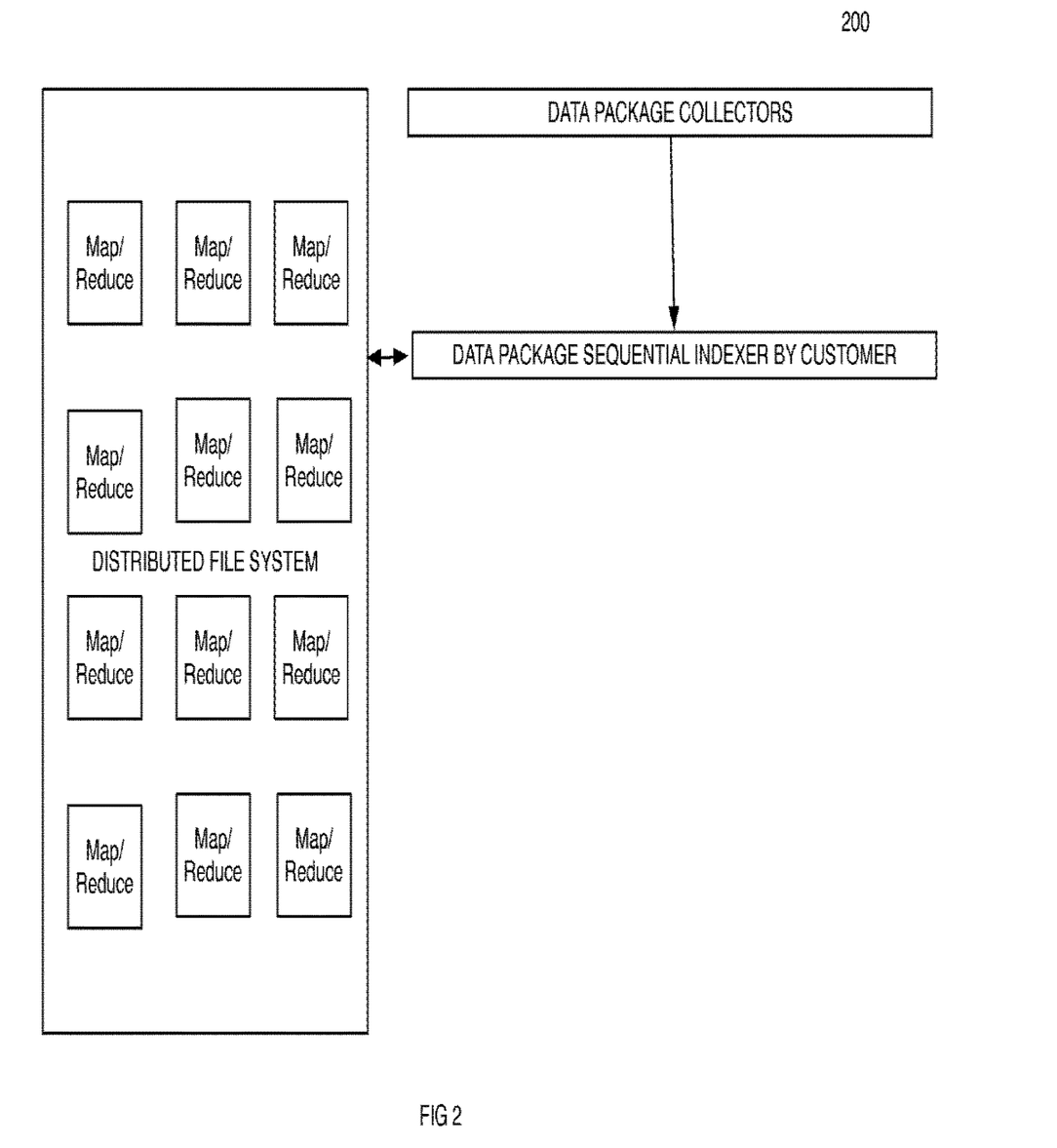
FIG. 2 is a data flow diagram of packages being received and stored with indexes.

The present invention includes a step of indexing the data packages as they arrive and are stored as illustrated in FIG. 2. Because the customer care requirement is relatively low volume, the data packages are removed from storage in a skipping sequential manner and directed to a Map/Reduce silo at a single node. Each transformation is identical to those applied to the entire data set in conventional Map/Reduce operations so that comparisons with "normal" or "typical" values are meaningful.

One aspect of the invention are methods when performed by processors that infer one of three types of patterns:

Inferencing Causality. A first event which generally precedes a second event within a range of time or events is associated as having a cause and effect relationship.

Inferencing Assertion/Assumption. A first event is assumed to be successful by assertion unless an objection is signaled within a range of time or events. Until a second event is received which "objects" to the first event, the first event is considered successful. In this case, silence implies success or validity.

Inferencing Propinquity. Two events may not be simultaneous or their it may not be possible to determine their position in absolute time but within a range they may be determined as propinquitous.

Figure 3:
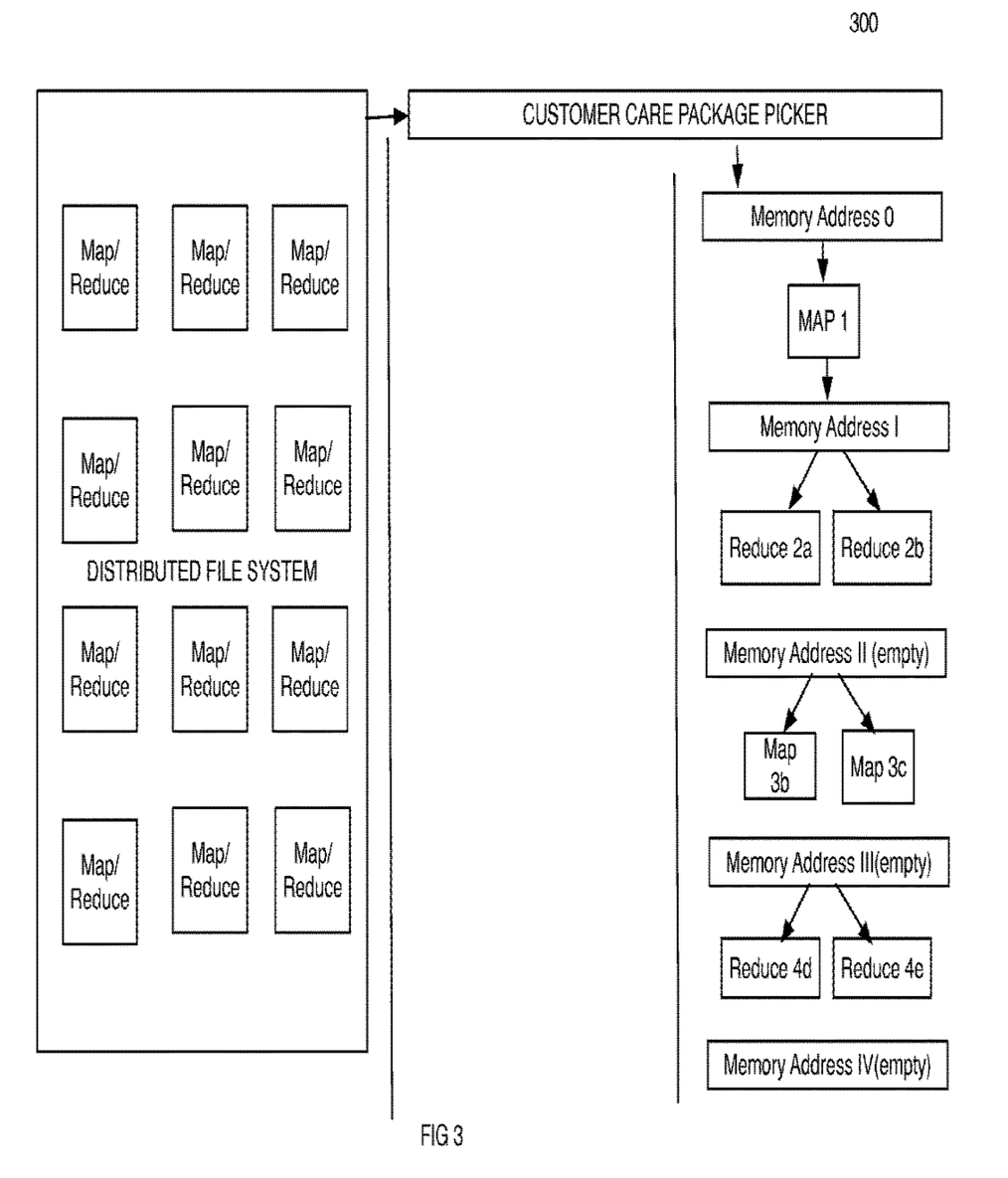
FIG. 3 is a data flow diagram of transformed metrics through an apparatus having a first silo of processors transforming metrics for a first customer.

A distinguishing characteristic of the invention is a method for streamlining Hadoop Map/Reduce through in-memory buckets as shown in FIG. 3.

Instead of scheduling Mapping in parallel at a plurality of nodes to receive and process data streamed from a storage, each desired Map/Reduce operation is hot and reads from an in-memory bucket and writes to an in-memory bucket.

In an embodiment, rather than having a sequence of Maps scheduled to each node, a plurality of nodes is permanently operating one of a sequence of Map and Reduce operations whose inputs and outputs are chained together by memory locations as shown in FIG. 4.

Figure 5:
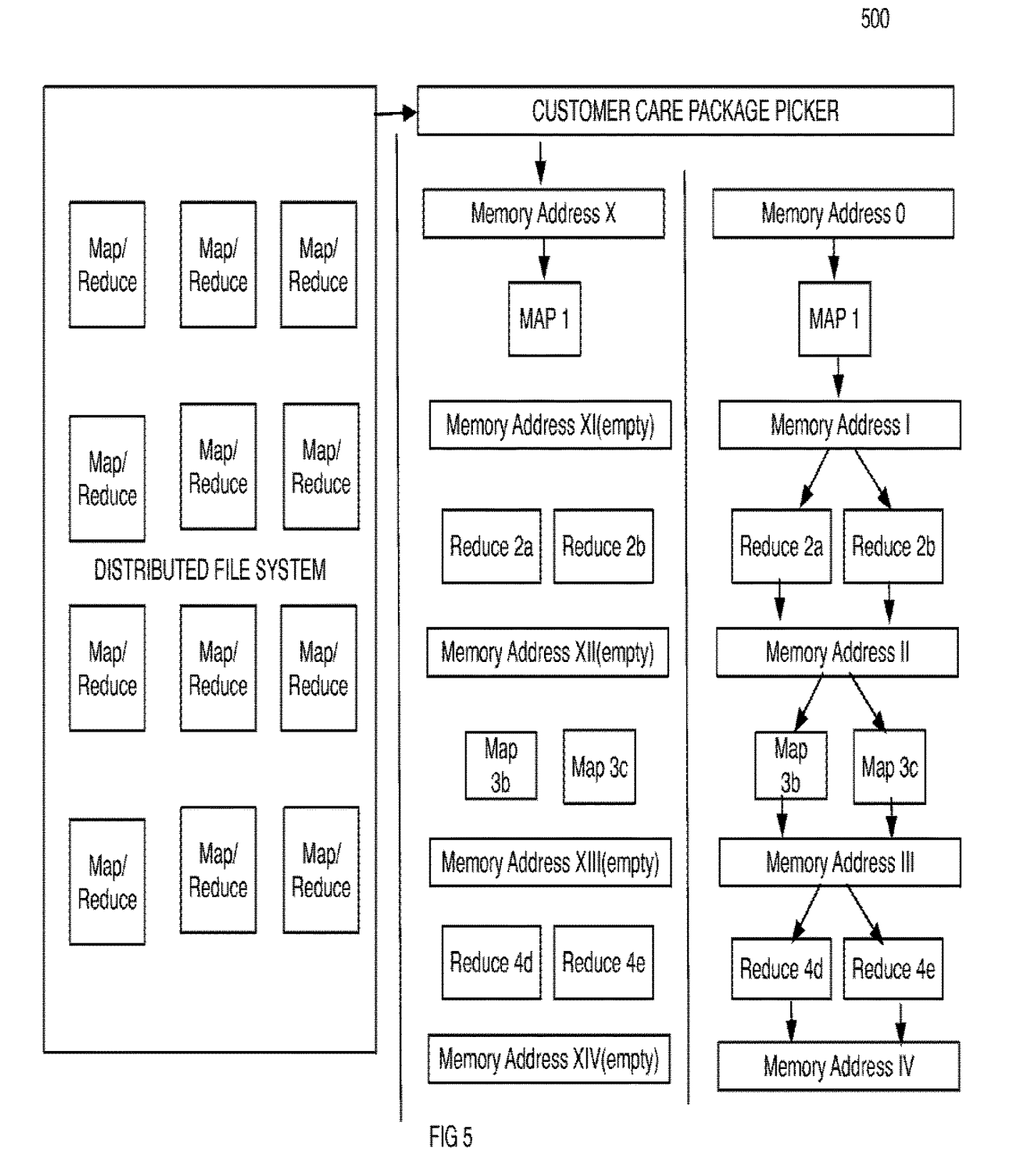
FIG. 5 shows initialization of the silo to specific transformations.

Some measure transformations require a series of map and reduce operations. Where these are the case, a pipeline consists of nodes each continuously operating a transformation and in-memory locations that store as intermediate results. Once a data package is stored in the first in-memory location, it is transformed by each node in turn until the output is in the last in-memory location as shown in FIG. 5. The customer care process begins by indexing every received data packet by its source storing the location in a file system. When a particular source is identified for analysis the index data base allows a stream of data packages all from the some source to be placed in the first in-memory location of a silo. In an embodiment, nodes are removed from the Hadoop system and configured into silos as customer care requests ramp up and are dynamically returned to the Hadoop system when not required for a customer care silos. When an empty silo becomes operational by receiving data in its first in-memory location, more nodes are removed from Hadoop and are configured as a hot silo.

Referring now to FIG. 2, an aspect of the present invention is indexing data packages by customer sequentially as they are received from the data package collectors and stored into the distributed file system. The index can be a separate database or simply added to each unstructured data element before it is stored. The index enables the method to skip forward to the next sequential location of a data package from a selected customer. It can be nearly as fast as streaming and the independent data blocks can be scanned in parallel. In an embodiment, map and reduce transformations do not depend on strict time ordered delivery of data packages because data collection and data transmission are not tightly coupled.

Referring now to FIG. 3, the customer care package picker has received a request to support a particular customer. Because all packages stored in the distributed file system have been sequentially indexed, each package points to the next and the file system can be efficiently traversed from some time in the past to the immediate present. The oldest packages are presented first to memory address 0 and transformed by MAP 1 in the same way as Hadoop would handle it. Instead of writing back into the distributed file system however, the silo has dedicated memory addresses for the outputs of each of the transformations. This avoid disk i/o and improves latency. As soon as memory address I is populated, the next transforms reduce 2a and reduce 2b can begin. FIG. 3 illustrates that map 3b, map 3c and reduce 4d and reduce 4e are ready and waiting for data to arrive in their respective input memory addresses. There is no clock or scheduler. When data is available, the process operates on it and writes to the output memory address.

Referring now to FIG. 4, as data packages are percolating through the first silo, a second silo can be readied for operation. Nodes are taken from the Hadoop pool and configured to run as data driven Map or Reduce daemons. Each transformation is driven by data being written into its input memory address. Until the first memory address is occupied, the nodes are idle. When no new data is placed into memory address 0, the first silo quiesces after all the transitions drop through to the silo. Silo 1 will be up to date with the latest data packages provided by the requesting customer. Because the same map and reduce transformations are used in the Hadoop pool, comparisons with typical or normal are valid.

Referring now to FIG. 5, a second customer care request is beginning to be serviced. The customer care package picker starts using an indexed sequential access method to pull data packages from a second customer in approximately sequential order out of the distributed file system and loads memory address X of the second silo. The first node of the second silo already has Map 1 loaded and ready to transform the contents of memory address X when it becomes non-empty. It will write its result into memory address XI when done which will initiate the Reduce 2a and Reduce 2b nodes. The data propagates through the silo to memory address XIV. Additional data packages of the second customer are streamed into memory address X as soon as it becomes available i.e. after Map 1 has written to memory address XI. In an embodiment, a third silo can be configured to be ready for a third customer care request by removing them from the on-going Hadoop pool. The first silo can be returned to use when the customer care interaction is completed either as a hot silo or broken down and returned to the Hadoop pool.

Referring now to FIG. 6, a conventional map reduce architecture provided a large number of nodes which enjoy fast access to a sub part of a distributed file system. Because the map reduce process breaks a problem up, many nodes operate the same transformation in parallel. Conventionally, data is transformed in time sequence by one of many local nodes and the result is returned to the initiating node for reduce operation. The advantage of conventional map reduce is that it takes advantage of many inexpensive resources to attack a big data network characterization problem. Unfortunately what is needed is a reduced latency solution for individual customers, which allows comparison with the population as a whole.

Figure 7:
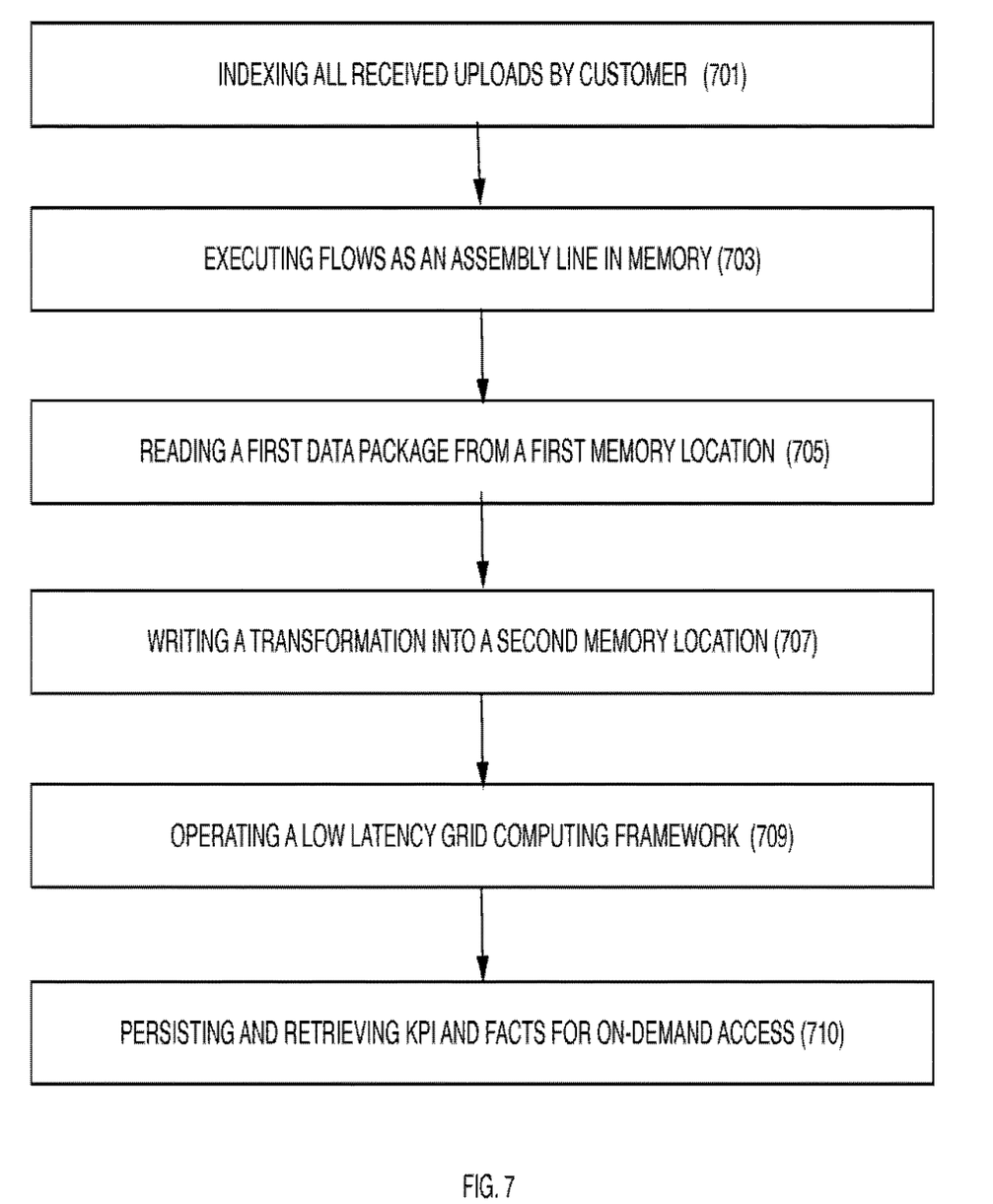
FIG. 7-8 are illustrations of method flowcharts of steps performed by a processor of FIG. 1.
Figure 8:
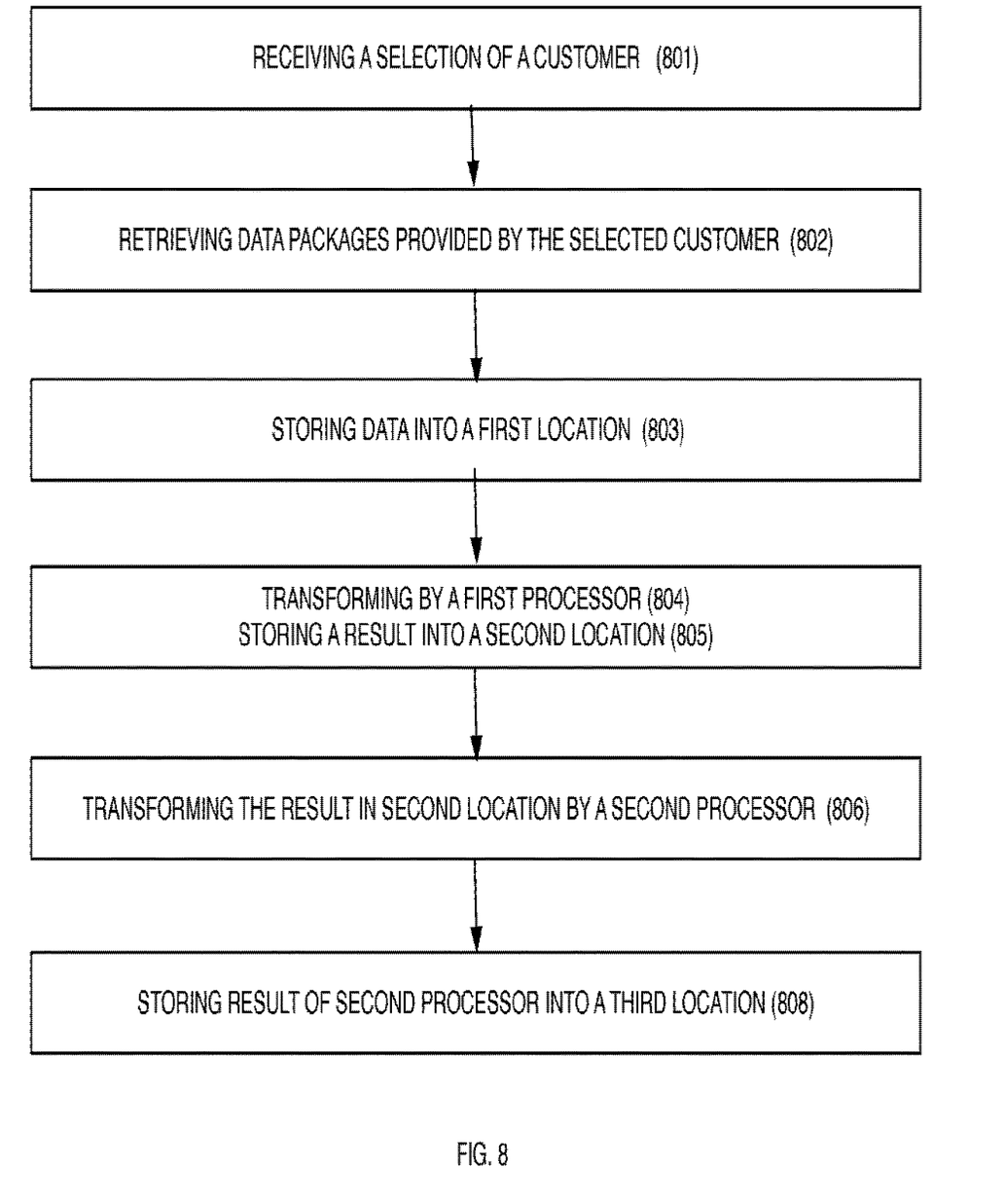

FIG. 7-8 illustrates embodiments of steps which when performed by a processor are a method.

One aspect of the invention is that the method executes either in a distributed Hadoop map/reduce environment or in memory.

One aspect of the invention is a framework for producing rich facts and KPIs (Key Performance Indicators) from metrics collected from wireless devices. The framework provides both Java APIs and an XML syntax for expressing the particular facts and KPIs to produce. Each particular executable instantiation of these Java and XML artifacts is referred to below as a flow. This framework supports different deployment models for a flow:

Full Batch (Hadoop Map/Reduce)
On-demand (in memory, not using Hadoop)

All deployment models concern the manner in which the huge amount of data from phones gets divided up into manageable amounts that can be computed. The invention addresses the previously unsolved challenge to ensure consistent results when dividing the data into chunks, as well as achieve acceptable turn-around time (measured in hours for batch and seconds for on-demand).

The on-demand customer care flow provides very rapid response to a customer service representative interacting live with a customer experiencing a problem with their device or the service that they are receiving. An on-demand customer care flow is initialized once and run multiple times. Each time that the flow is executed, it is passed uploads for one particular customer.

The on-demand customer care flow is distinguished by not running on a grid. Instead the measure assembly line processes the uploads and produces the measures.

Unlike conventional methods the intermediate measures are not written to disk. Instead the measures are kept in memory and passed to the next enrichment that consumes them. Intermediate measures are normally discarded from memory after each execution of the flow. Injected measures are produced only during the first execution of the flow. Any enriched measure that is produced solely from injected measures will also be produced only during the first execution of the flow. If such measures are used only as direct inputs then they will be discarded from memory after the first execution of the flow. (Note that the measure definition that was initialized with the direct input measures will have some or all that information in its own hash map). But if an injected measure is processed as bucketed input to an enrichment that also consumes customer-related packages, as in a join cached measure, then that intermediate output will be retained and be completely reprocessed in every execution of a flow.

Instead the invention fully processes the data collected in the 24 hours since the last batch, and combine it with data collected in the 30 previous daily batch runs. But because lots of data gets correlated or aggregated across day boundaries, and because a lot of the data that we collect each day reflect events that occurred on the phone several days or more earlier, it is extremely challenging to figure out what computations performed on prior days need to be redone today.

The on-demand customer care flow provides very rapid response to a customer service representative interacting live with a customer experiencing a problem with their device or the service that they are receiving.

An on-demand customer care flow is initialized once and run multiple times. Each time that the flow is executed, it is passed uploads for one particular customer.

In an embodiment the measure assembly line processes the uploads and produces the measures. The intermediate measures are not written to disk as is done conventionally. Instead the measures are kept in memory and passed to the next enrichment that consumes them. Intermediate measures are normally discarded from memory after each execution of a conventional flow.

One aspect of the invention is a method for performing steps by a plurality of processors as illustrated in FIG. 7 comprising: indexing 701 all received uploads to enable low latency access to all uploads for a device; executing flows 703 as an assembly line in memory, each processor reading 705 a first data package from a first location and writing 707 to a second location whereby disk operations are minimized; operating 709 a low latency grid computing framework which scales; and persisting and retrieving 710 key performance indicators (kpi) and facts for on-demand speedy access.

In an embodiment the method further includes processes as illustrated in FIG. 8: receiving 801 a selection of a customer; retrieving 802 data packages provided by the selected customer from a distributed file system; storing 803 data from the data packages into a first location of data storage according to a first memory address; transforming 804 by a first processor, the data read from the first memory address according to a first plurality of instructions from an instruction store; storing 805 the result of the transformation into a second location of data storage according to a second memory address; transforming 806 by a second processor, the data read from the second memory address according to a second plurality of instructions from the instruction store; and storing 808 the result of the transformation by the second processor into a third location of data storage according to a third memory address.

Figure 9:
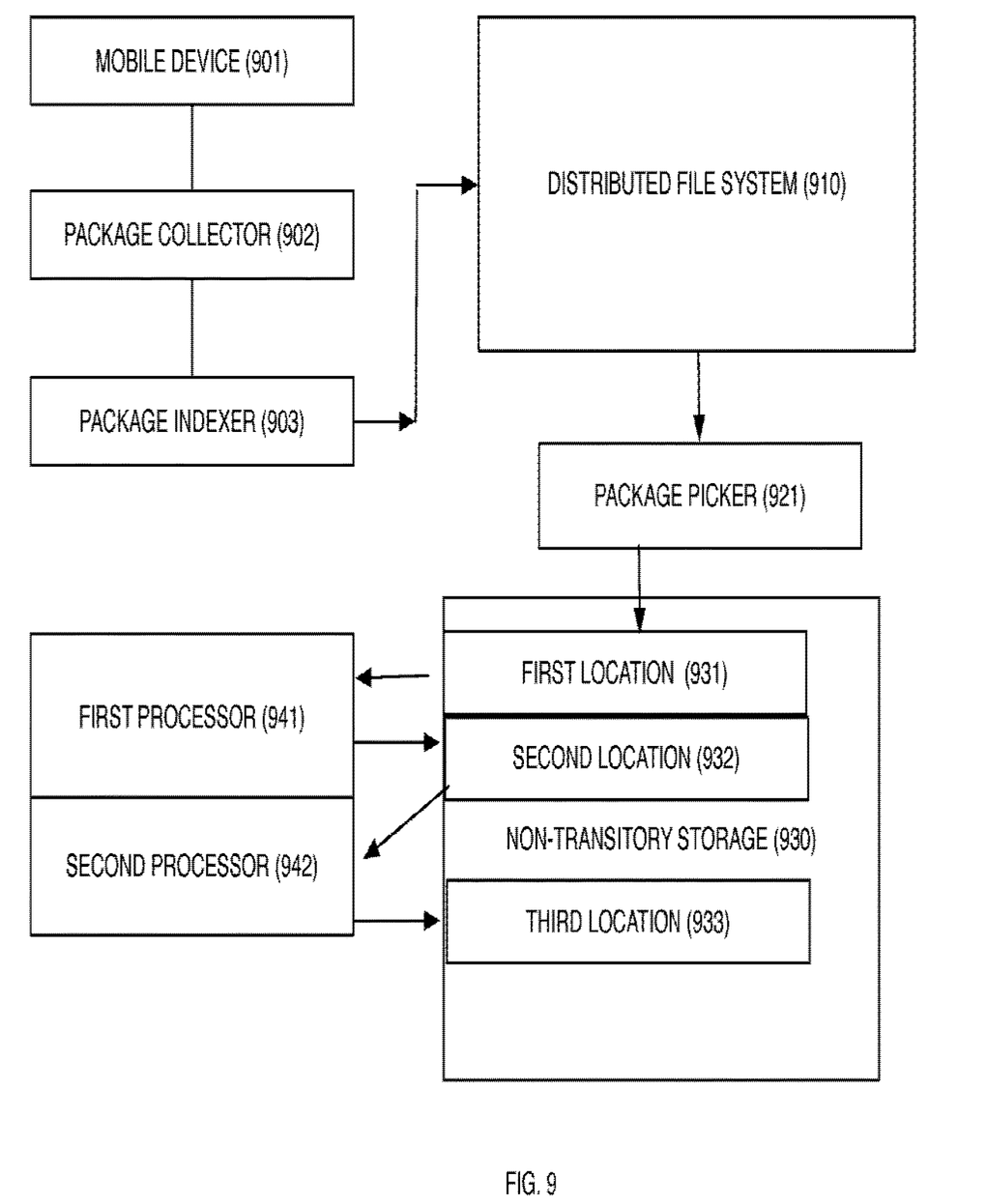
FIG. 9 is a system block diagram of an embodiment.

Another aspect of the invention is a silo system 900 as illustrated in FIG. 9 comprising: a plurality of data package collectors 902, the collectors communicatively coupled to at least one mobile device 901 configured with a data collection agent, each data package collector further coupled to a data package sequential indexer by customer circuit 903, said data package sequential indexer circuit coupled to a distributed file system 910 whereby map/reduce circuits determine metrics for the population of mobile devices; the distributed file system further coupled to a customer care package picker 921 whereby packages collected from a selected customer are directed to a location of non-transitory storage at a first memory address 931; the location of non-transitory storage at a first memory address communicatively coupled to a first processor 941; the first processor which executes instructions to perform a first transformation and store a first result into a location of non-transitory storage at a second memory address 932; the location of non-transitory storage at a second memory address communicatively coupled to a second processor 942; and the second processor which executes other instructions to perform a second transformation and store a second result into the distributed file system 933, whereby a silo is kept ready for transformation of data whenever a customer is selected.

Figure 10:
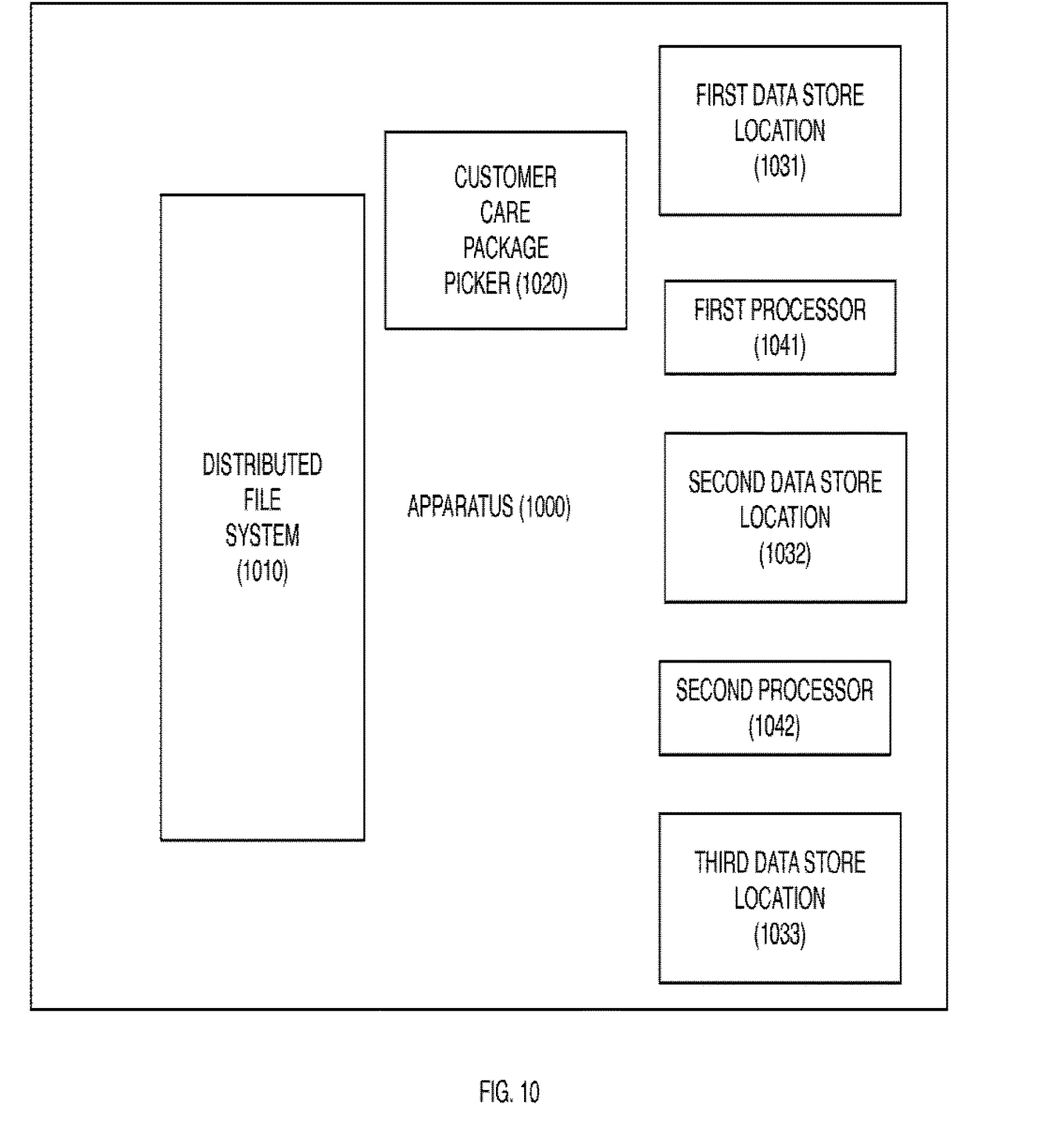
FIG. 10 is a block diagram of an apparatus aspect of the invention.

Another aspect of the invention is an apparatus 1000 as illustrated in FIG. 10 comprising a plurality of processors, non-transitory data and instruction storage, and a customer care package picker circuit; the customer care package picker circuit coupled to a distributed file system whereby data from packages received from a selected customer are read and stored to a first location in data storage; a first processor 1041, performing steps from instruction storage, coupled to the first location 1031 in data storage, to transform the data stored in the first location in data storage and to store the result into a second location 1032 in data storage; a second processor 1042 coupled to the second location in data storage, performing steps from instruction storage, to transform the data stored in the second location in data storage and to store the result into a third location 1033 in data storage, whereby processors form a silo of transformations.

CONCLUSION

The method of operation is easily distinguished from conventional parallel processing approaches by assigning a specific transformation such as a map or a reduce function to a processor, which is data driven by a memory location.

It is distinguishing characteristic that each stage of a transformation has a dedicated memory output location, which may be the source of another stage.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

An Exemplary Computer System

Figure 1:
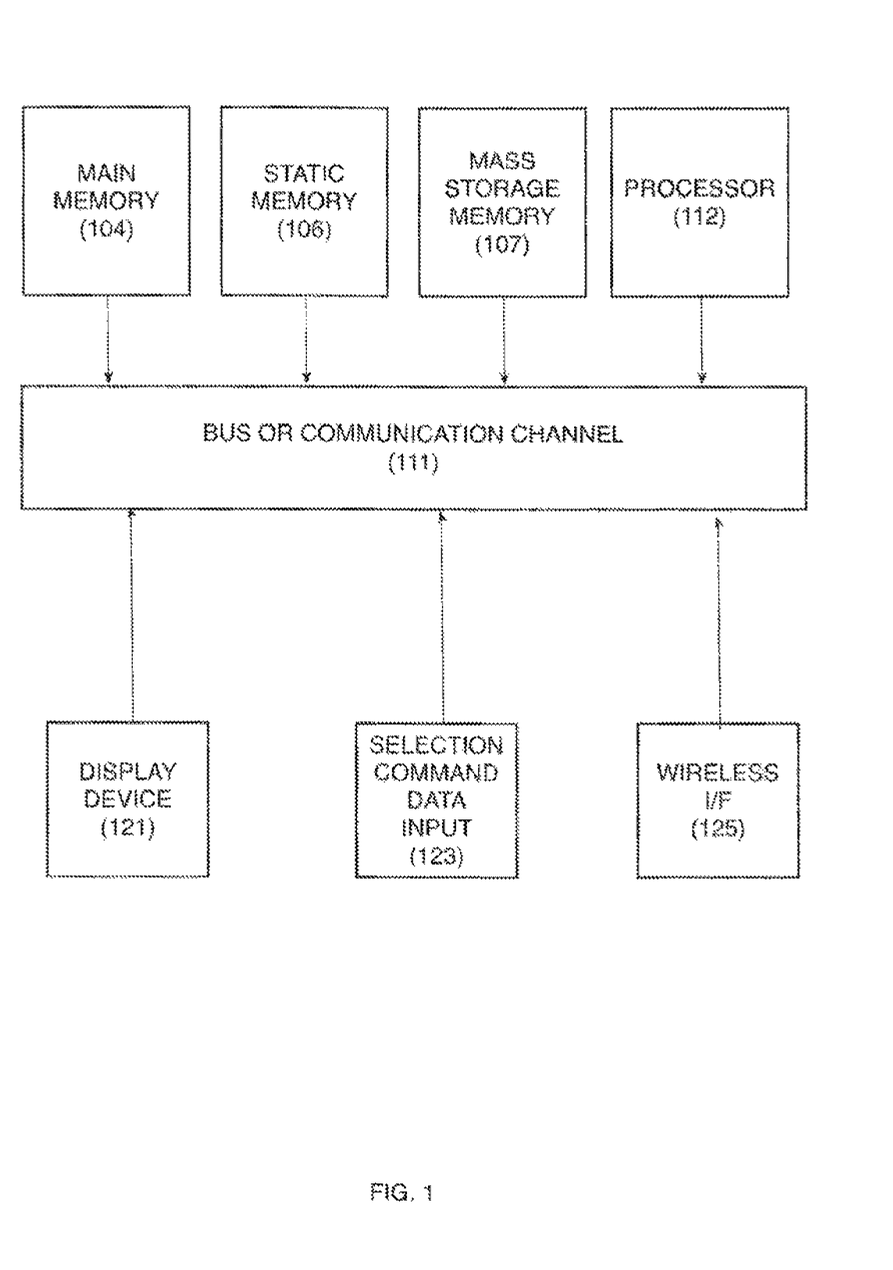
FIG. 1 is a block diagram of an exemplary computer system.

FIG. 1 is a block diagram of an exemplary computer system that may be used to perform one or more of the functions described herein. Referring to FIG. 1, computer system 100 may comprise an exemplary client or server 100 computer system. Computer system 100 comprises a communication mechanism or bus 111 for communicating information, and a processor 112 coupled with bus 111 for processing information. Processor 112 includes a microprocessor, but is not limited to a microprocessor, such as for example, ARM™, Pentium™, etc.

System 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor 112.

Computer system 100 also comprises a read only memory (ROM) and/or other static storage device 106 coupled to bus 111 for storing static information and instructions for processor 112, and a non-transitory data storage device 107, such as a magnetic storage device or flash memory and its corresponding control circuits. Data storage device 107 is coupled to bus 111 for storing information and instructions.

Computer system 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a wireless interface 125 for communicating selections and command and data input to processor 112.

Note that any or all of the components of system 100 and associated hardware may be used in the present invention. However, it can be appreciated that other configurations of the computer system may include some or all of the devices in one apparatus, a network, or a distributed cloud of processors.

The embodiments described herein may include the use of a special purpose or general-purpose computer including various computer hardware or software modules, as discussed in greater detail below.

Embodiments within the scope of the present invention also include non-transitory, computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other non-transitory medium which can be used to store desired program code means in the form of computer-executable instructions or data structures and which can be accessed for execution by a general purpose or special purpose computer to perform a method as disclosed above.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Those skilled in the art will appreciate that the invention may be practiced in network computing environments with many types of computing system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices or servers that are linked (either by hardwired links, wireless links, or by a combination of hardwired or wireless links) through a communications network. In a distributed computing environment, program modules may be located in both local and remote memory storage devices.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. A number of embodiments of the invention have been described. Nevertheless, it will be understood that various modifications may be made without departing from the spirit and scope of the invention. For example, other network topologies may be used. Accordingly, other embodiments are within the scope of the following claims.

We claim:

1. A method, comprising:

receiving, by a system comprising a processor, a signal corresponding to a customer associated with a user equipment that is a member of a defined population of user equipment;

retrieving, by the system, a data package comprising metrics collected by the user equipment, wherein the metrics concern performance of the user equipment via a network;

storing, by the system, the data package in a first memory location of random access memory locations in a memory device of the system;

allocating, by the system to a customer care process, a group of processor nodes from a distributed pool of processor nodes;

executing, by the system, the customer care process using the random access memory locations and the group of processor nodes, comprising:

transforming, by a first processor node of the group of processor nodes, the metrics in the first memory location into measures that are configured to enable derivation of a key performance indicators concerning the performance of the user equipment;

outputting, by the first processor node, the measures to a second memory location of the random access memory locations;

generating, by a second processor node of the group of processor nodes, an enriched measure by processing the measures in the second memory location based on correlations of user equipment events in a time sequence;

outputting, by the second processor node, the enriched measure to a third memory location of the random access memory locations;

transforming, by a third processor node of the group of processor nodes, the enriched measure in the third memory location into a first key performance indicator that is specific to the performance of the user equipment;

outputting, by the third processor node, the first key performance indicator to a fourth memory location of the random access memory locations;

comparing, by a fourth processor node of the group of processor nodes, the first key performance indicator of the user equipment in the fourth memory location to a second key performance indicator of the defined population of user equipment;

outputting, by the fourth processor node, a result of the comparison of the first key performance indicator to the second key performance indicator to a fifth memory location of the random access memory locations;

using, by a fifth processor node of the group of processor nodes, the result of the comparison in the fifth memory location to identify a resolution to a problem with an operation of the user equipment; and outputting, by the fifth processor node, the resolution to a sixth memory location of the random access memory locations.

2. The method of claim 1, wherein executing the customer care process is performed without writing contents of the first memory location, the second memory location, the third memory location, the fourth memory location, the fifth memory location, and the sixth memory location to a disk storage of the system.

3. The method of claim 1, wherein the result of the comparison comprises a variance between the first key performance indicator of the user equipment and the second key performance indicator of the defined population of user equipment.

4. The method of claim 1, further comprising storing, by the system, data packages corresponding to additional customers that are associated with respective user equipment of a subset of the defined population of user equipment, and wherein a record is kept that enables retrieval, during a predetermined range of time, of a specified data package associated with any specified user equipment of the respective user equipment.

5. The method of claim 1, wherein resolving the problem with the operation of the user equipment comprises at least one of installing an update on the user equipment or adjusting a setting of the user equipment.

6. The method of claim 1, wherein the method is performed on-demand via a device associated with the customer.

7. The method of claim 1, wherein transforming the metrics into the measures comprises anonymizing the metrics.

8. The method of claim 1, wherein the user equipment of the defined population of user equipment are associated with respective customers that are similar.

9. The method of claim 1, wherein the resolution is applied to another user equipment of the defined population of user equipment.

10. A non-transitory machine-readable medium, comprising executable instructions that, when executed by a processor of a system, facilitate performance of operations, comprising:

receiving a signal corresponding to a customer associated with a user equipment that is a member of a defined population of user equipment;

obtaining a data package comprising metrics collected by the user equipment, wherein the metrics concern performance of the user equipment in a network;

storing the data package in a first memory location of random access memory locations in a memory device of the system;

allocating, to a customer care process, a group of processor nodes from a distributed pool of processor nodes;

executing the customer care process using the random access memory locations and the group of processor nodes, comprising:

transforming, by a first processor node of the group of processor nodes, the metrics in the first memory location into measures that are configured to enable derivation of a key performance indicators concerning the performance of the user equipment, and outputting, by the first processor node, the measures to a second memory location of the random access memory locations;

generating, by a second processor node of the group of processor nodes, an enriched measure by processing the measures in the second memory location based on correlations of user equipment events in a time sequence, and outputting, by the second processor node, the enriched measure to a third memory location of the random access memory locations;

transforming, by a third processor node of the group of processor nodes, the enriched measure in the third memory location into a first key performance indicator that is specific to the performance of the user equipment, and outputting, by the third processor node, the first key performance indicator to a fourth memory location of the random access memory locations;

comparing, by a fourth processor node of the group of processor nodes, the first key performance indicator of the user equipment in the fourth memory location to a second key performance indicator of the defined population of user equipment, and outputting, by the fourth processor node, a result of the comparison of the first key performance indicator to the second key performance indicator to a fifth memory location of the random access memory locations; and using, by a fifth processor node of the group of processor nodes, the result of the comparison in the fifth memory location to identify a resolution to a problem with an operation of the user equipment, and outputting, by the fourth fifth processor node, the resolution to a sixth memory location of the random access memory locations.

11. The non-transitory machine-readable medium of claim 10, wherein executing the problem resolution process is performed without writing contents of the first memory location, the second memory location, the third memory location, the fourth memory location, the fifth memory location, and the sixth memory location to a disk storage of the system.

12. The non-transitory machine-readable medium of claim 10, wherein the result of the comparison comprises a variance between the first key performance indicator of the user equipment and the second key performance indicator of the defined population of user equipment.

13. The non-transitory machine-readable medium of claim 10, wherein the operations further comprise storing data packages from additional customers that are associated with respective user equipment of a subset of the defined population of user equipment, and wherein a record is kept that enables retrieval, during a predetermined range of time, of a data package associated with any specific user equipment of the respective user equipment.

14. The non-transitory machine-readable medium of claim 10, wherein resolving the problem with the operation of the user equipment comprises at least one of installing an update on the user equipment or adjusting a setting of the user equipment.

15. The non-transitory machine-readable medium of claim 10, wherein the operations are performed on-demand based on a request received from the customer.

16. The non-transitory machine-readable medium of claim 10, wherein transforming the metrics into the measures comprises anonymizing the metrics.

17. A system, comprising:
a processor; and
a memory that stores executable instructions that, when executed by the processor, facilitate performance of operations, comprising:
receiving a signal corresponding to a customer associated with a user equipment that is a member of a defined population of user equipment;
obtaining a data package comprising metrics collected by the user equipment, wherein the metrics concern performance of the user equipment;
storing the data package in a first memory location of random access memory locations in the memory of the system;
allocating, to a customer care process, a group of processor nodes from a distributed pool of processor nodes;
executing the customer care process using the random access memory locations and the group of processor nodes, comprising:
transforming, by a first processor node of the group of processor nodes, the metrics in the first memory location into measures that are configured to enable derivation of key performance indicators concerning the performance of the user equipment, and outputting, by the first processor node, the measures to a second memory location of the random access memory locations;
generating, by a second processor node of the group of processor nodes, an enriched measure by processing the measures in the second memory location based on correlations of user equipment events in a time sequence, and outputting, by the second processor node, the enriched measure to a third memory location of the random access memory locations;
transforming, by a third processor node of the group of processor nodes, the enriched measure in the third memory location into a first key performance indicator that is specific to the performance of the user equipment, and outputting, by the third processor node, the first key performance indicator to a fourth memory location of the random access memory locations;
comparing, by a fourth processor node of the group of processor nodes, the first key performance indicator of the user equipment in the fourth memory location to a second key performance indicator of the defined population of user equipment, and outputting, by the fourth processor node, a result of the comparison of the first key performance indicator to the second key performance indicator to a fifth memory location of the random access memory locations; and
using, by a fifth processor node of the group of processor nodes, the result of the comparison in the fifth memory location to identify a resolution to a problem with an operation of the user equipment, and outputting, by the fifth processor node, the resolution to a sixth memory location of the random access memory locations.

18. The system of claim 17, wherein the defined population of user equipment is associated with respective customers that are similar, and wherein the resolution is applied to another user equipment of the defined population of user equipment other than the user equipment.

19. The system of claim 17, wherein executing the customer care process is performed without writing contents of the first memory location, the second memory location, the third memory location, the fourth memory location, the fifth memory location, and the sixth memory location to a disk storage of the system.

20. The system of claim 17, wherein the result of the comparison comprises a variance between the first key performance indicator and the second key performance indicator.

* * * * *